United States Patent
Chang et al.

(10) Patent No.: US 11,738,406 B2
(45) Date of Patent: Aug. 29, 2023

(54) METHOD FOR LASER CARVING OF PAINT ON AN OUTER SURFACE OF A VEHICLE WHEEL

(71) Applicants: JIAN SIN INDUSTRIAL CO., LTD., Changhwa Hsien (TW); VOLVO CAR CORPORATION, Gothenburg (SE)

(72) Inventors: Ching Jui Chang, Douliu (TW); Jui Lung Kao, Chiayi County (TW); Yung Sheng Wang, Yunlin County (TW); Viktor Robertsson, Gothenburg (SE); Andreas Andreen, Gothenburg (SE); Juan Zhao, Shanghai (CN)

(73) Assignees: Jian Sin Industrial Co., Ltd., Changhwa Hsien (TW); Volvo Car Corporation, Goeteborg (SE)

( * ) Notice: Subject to any disclaimer, the term of this patent is extended or adjusted under 35 U.S.C. 154(b) by 608 days.

(21) Appl. No.: 16/910,545

(22) Filed: Jun. 24, 2020

(65) Prior Publication Data

US 2021/0008667 A1    Jan. 14, 2021

(30) Foreign Application Priority Data

Jul. 11, 2019    (TW) ................. 108124470

(51) Int. Cl.
*B23K 26/352*    (2014.01)
*B23K 26/70*    (2014.01)
*B23K 26/362*    (2014.01)
*B23K 26/40*    (2014.01)
*B44C 1/22*    (2006.01)

(52) U.S. Cl.
CPC .......... *B23K 26/355* (2018.08); *B23K 26/362* (2013.01); *B23K 26/40* (2013.01); *B23K 26/702* (2015.10); *B44C 1/228* (2013.01)

(58) Field of Classification Search
CPC .... B44C 1/228; B23K 26/362; B23K 26/702; B23K 26/355
USPC ...................................... 219/121.69
See application file for complete search history.

(56) References Cited

U.S. PATENT DOCUMENTS 6,929,534 B2 *   8/2005   Miyazawa .............. B24B 13/01
                                                      451/529
7,919,191 B2 *   4/2011   Arnold ..................... B28D 1/00
                                                      428/542.2
9,314,871 B2 *   4/2016   Nashner ................ B23K 26/354
(Continued)

FOREIGN PATENT DOCUMENTS

CN         105008588 B    *   4/2018   ............ B24B 1/00
CN         108189610 A    *   6/2018   ............ B23K 26/36
WO     WO-2014017995 A2   *   1/2014   ............ B44C 1/228

*Primary Examiner* — Jimmy Chou
(74) *Attorney, Agent, or Firm* — Rosenberg, Klein & Lee

(57) ABSTRACT

A method for laser carving of paint on an outer surface of a vehicle wheel includes a step of priming: priming an outer surface of the wheel to form a painted surface; a step of laser carving: carving the primer from a selected area of the wheel by laser to remove the painted surface from the selected area, the selected area having an exposed area with metallic luster, and a step of fine-polish: polishing the outer surface of the wheel to form a fine-polished area at the exposed area. The painted surface on the wheel can be quickly removed to disclose a selected area with metallic luster, while the wheel is prevented from corrosion so as to reduce manufacturing cost and increase precision.

3 Claims, 8 Drawing Sheets

(56) References Cited

U.S. PATENT DOCUMENTS

| | | | | |
|---|---|---|---|---|
| 2005/0173968 A1* | 8/2005 | Rivers | ............ | B60B 7/20 |
| | | | | 301/37.25 |
| 2005/0285440 A1* | 12/2005 | Bal | ............ | B60B 21/023 |
| | | | | 301/63.101 |
| 2008/0307631 A1* | 12/2008 | Lin | ............ | A63B 53/04 |
| | | | | 29/527.4 |
| 2011/0018335 A1* | 1/2011 | Hodges | ............ | B60B 23/10 |
| | | | | 29/525.01 |
| 2014/0363608 A1* | 12/2014 | Russell-Clarke | ............ | B44C 1/005 |
| | | | | 428/156 |
| 2015/0181718 A1* | 6/2015 | Wang | ............ | B23K 26/361 |
| | | | | 29/846 |
| 2015/0221242 A1* | 8/2015 | Cable | ............ | G09F 3/14 |
| | | | | 40/661.01 |

\* cited by examiner

METHOD FOR LASER CARVING OF PAINT ON AN OUTER SURFACE OF A VEHICLE WHEEL

BACKGROUND OF THE INVENTION

1. Fields of the Invention

The present invention relates to a method for laser carving of paint on an outer surface of a vehicle wheel.

2. Descriptions of Related Art

Conventional vehicle wheels are treated with paint to protect the material of the wheel from corrosion and rusting. The treated wheels are also to attract people's attention to enhance aesthetic feature of the vehicle.

CN100371091 discloses a method of surface treatment for vehicle wheels wherein the wheel is applied with a primer and a color paint is sprayed Onto the primer. A resin protective film is applied to the color paint. The resin protective film and the color paint of a selected area are removed by way of milling to expose its initial surface of the wheel. The wheel is then treated by processes of electroplating. Therefore, the wheel includes colored areas and the electroplated area.

It is noted that the milling process is made by Computer numeral Control (CNC), and it requires a lot of preparing steps such as programing and replacing blades according the wheels are of different shapes and sizes. Besides, CNC consumes a lot of power energy which uses about 12 kw energy power so that the cost is increased.

The blades of CNC needs to be maintained and replaced when needed, once the blades are blunt, the surfaces of the wheels include surplus material which reduce ability of anti-corrosion.

The present invention intends to provide a method to eliminate the shortcomings mentioned above.

SUMMARY OF THE INVENTION

The present invention relates to a method for laser carving an outer surface of a vehicle wheel includes a step of priming: applying a primer on an outer surface of the wheel to form a painted surface; a step of laser carving: carving a selected area of the primer form the wheel by laser to remove the primer in the selected area from the surface of the wheel, the selected area having an exposed area with metallic luster, and a step of fine-polish: polishing the outer surface of the wheel to form a fine-polished area at the exposed area.

The painted surface on the wheel can be quickly removed to disclose a selected area with metallic luster, while the wheel is prevented from corrosion so as to reduce manufacturing cost and precision. The method includes less number of steps compared with the conventional method, with less equipment required. The efficiency for removing the painted surface from the wheel is increased. The power for the laser carving machine used in this method is 0.5 kw which is only ¹⁄₂₄ of the power energy required for CNCs. The method is suitable for carving to wheels for both small and large number of wheels.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

The method of the present invention uses a laser carving machine to proceed the step of laser carving of the method, wherein the laser carving machine includes scanning speed of 100 mm/s to 4000 mm/s, laser frequency of 1 kHz to 6 kHz, power of 1 W to 500 W, wave length of 9000 nm (nanometers) to 11000 nm (nanometers), and light type of $CO_2$/fiber.

Referring to FIGS. 1 to 8, the wheel 1 to be treated by the method of the present invention includes a rim 2 and multiple spokes 3. The method of the present invention using the laser carving machine comprises a step of priming S1, a step of laser carving S2, and a step of fine-polish S3.

Figure 1:
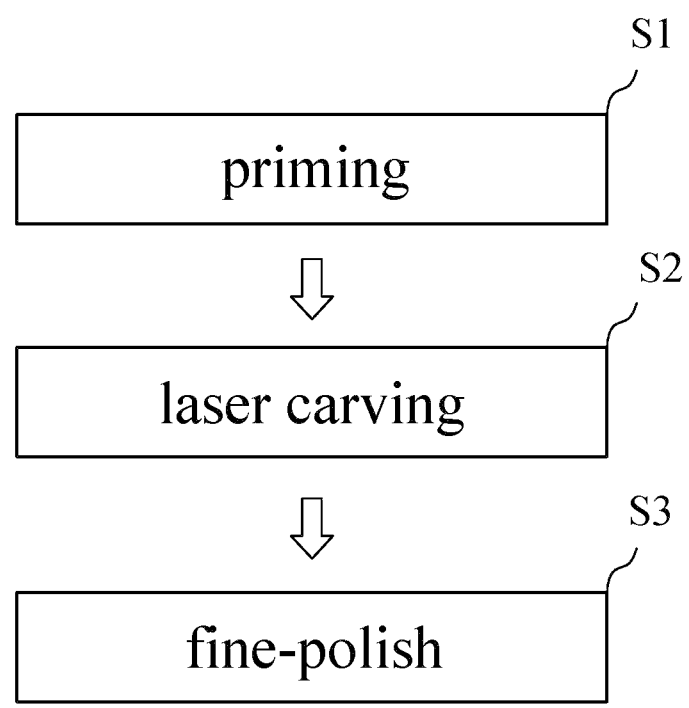
FIG. 1 discloses the steps of the first embodiment of the method of the present invention.
Figure 2:
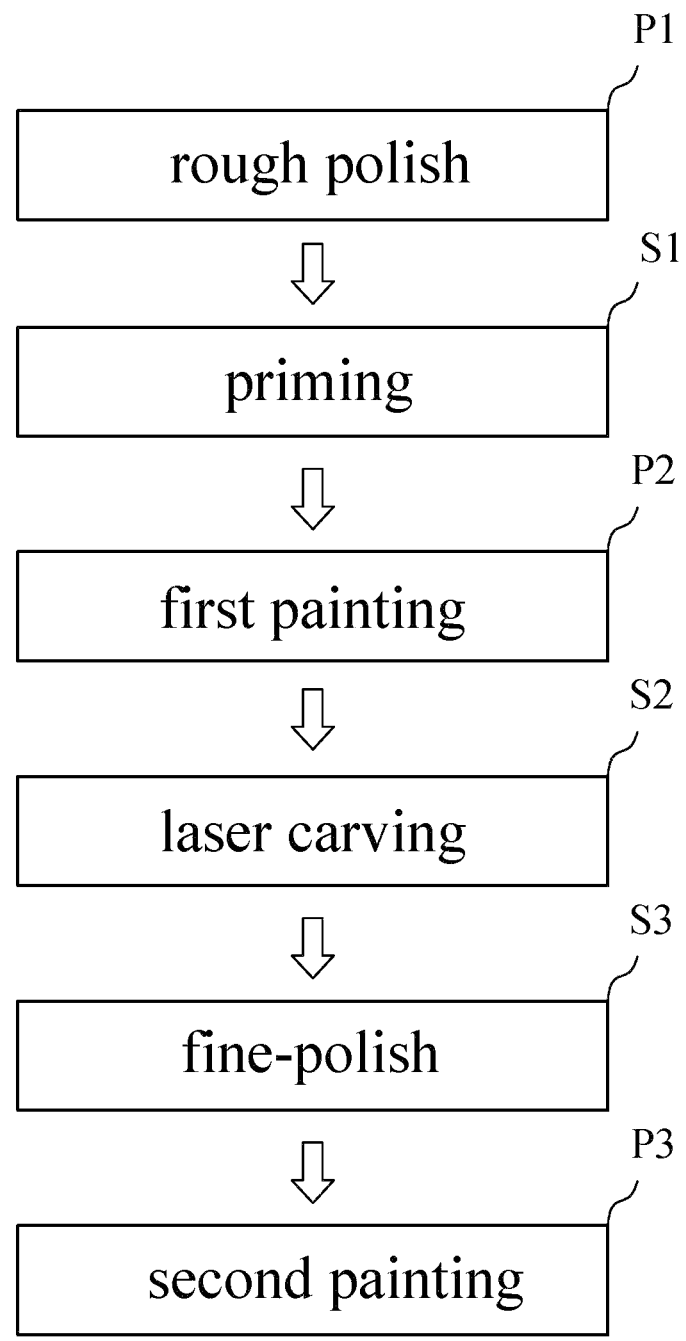
FIG. 2 discloses the steps of the second embodiment of the method of the present invention.
Figure 3:
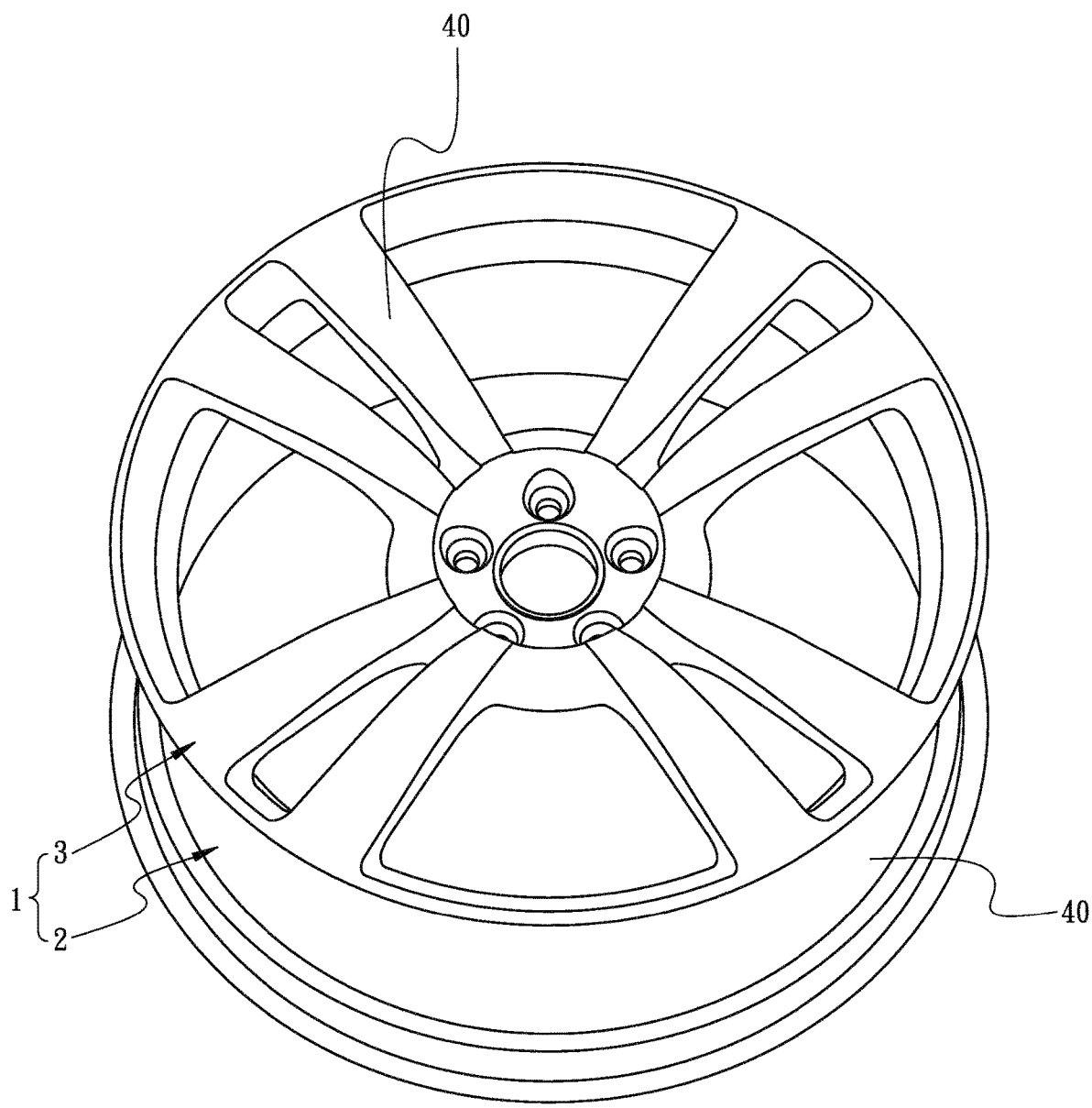
FIG. 3 shows the wheel to be treated by the method of the present invention.
Figure 4:
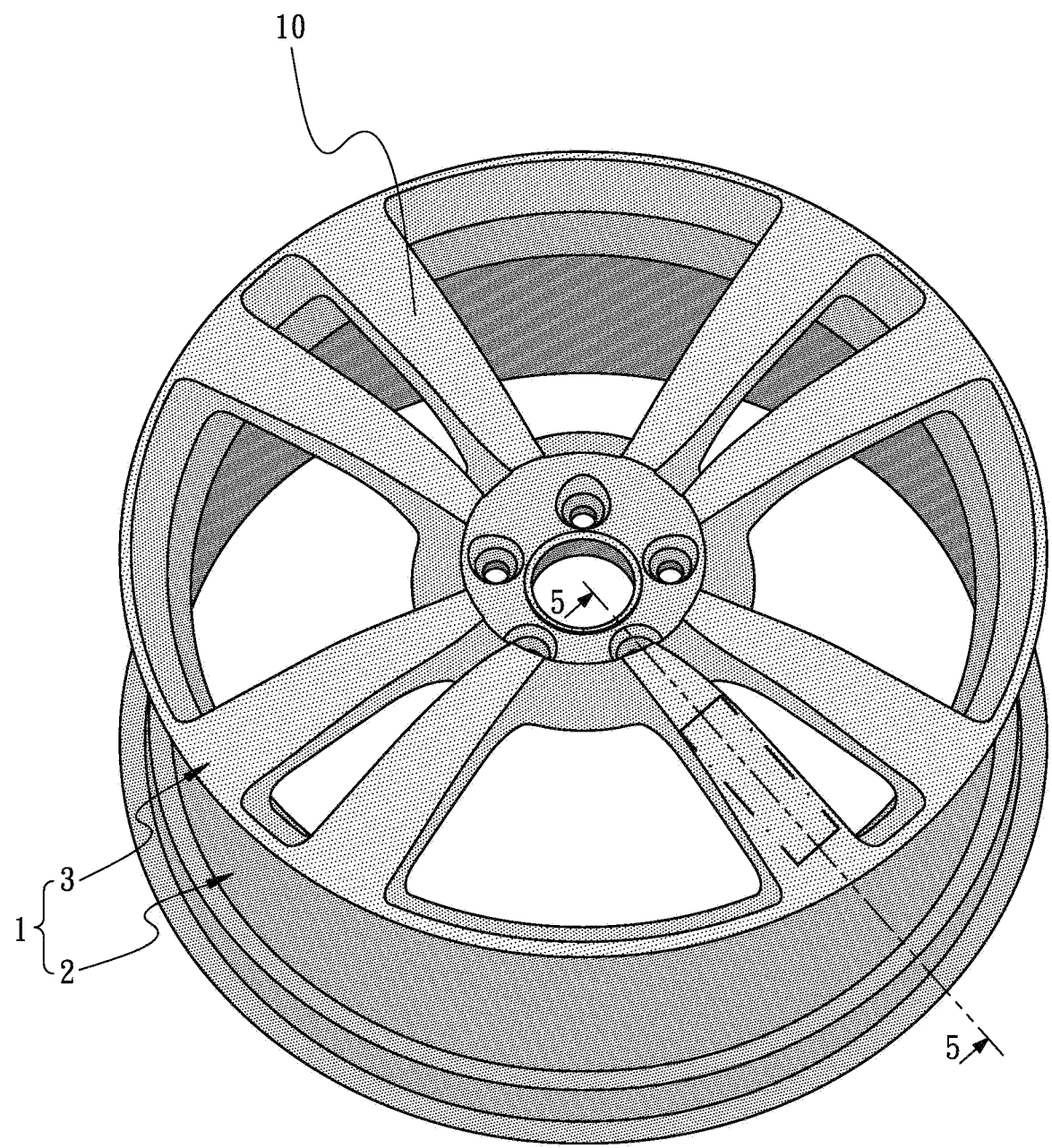
FIG. 4 shows the wheel that is treated by the step of priming of the method of the present invention.
Figure 5:
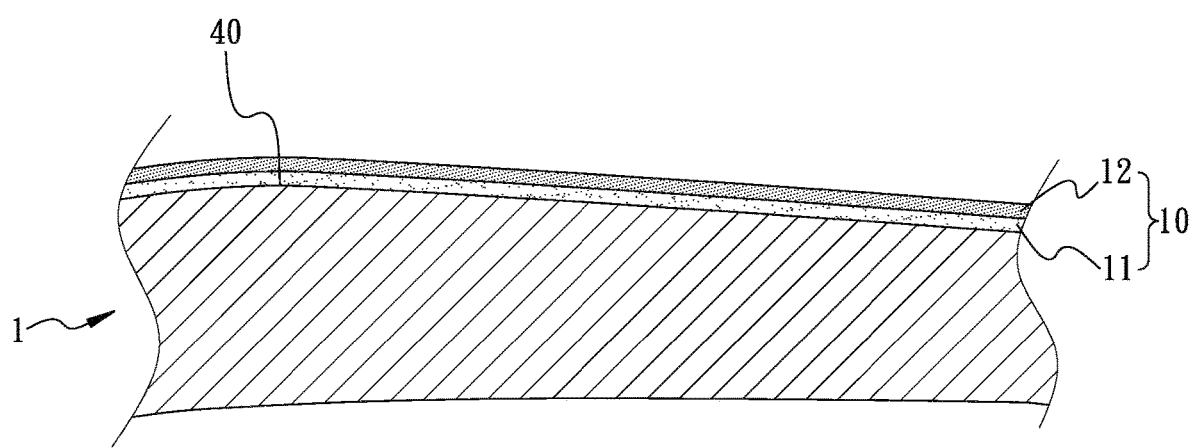
FIG. 5 is a longitudinal sectional view of a spoke of the wheel to show the selected area after the step of priming.

As shown in FIGS. 2 to 4, in the step of priming S1, an outer surface of the wheel 1 is painted to form a painted surface 10. The outer surface of the wheel 1 is painted to form a painted surface 10. The outer surface of the wheel 1 is the surface which is visible when the wheel 1 is attached to a vehicle. The outer surface of the wheel 1 is applied with a primer by way of spraying in the step of priming S1 to form an first layer of paint or an undercoat 11 which hides dents or scratches of the wheel 1. The first layer or undercoat 11 also covers orifices in the outer surface of the wheel 1 to protect the wheel 1 from corrosion. The primer as well can be a bonding agent. Furthermore, a color layer 12 is applied on the first layer or undercoat 11 and combined with the first layer or undercoat 11 to obtain a colored painted surface 10.

Figure 6:
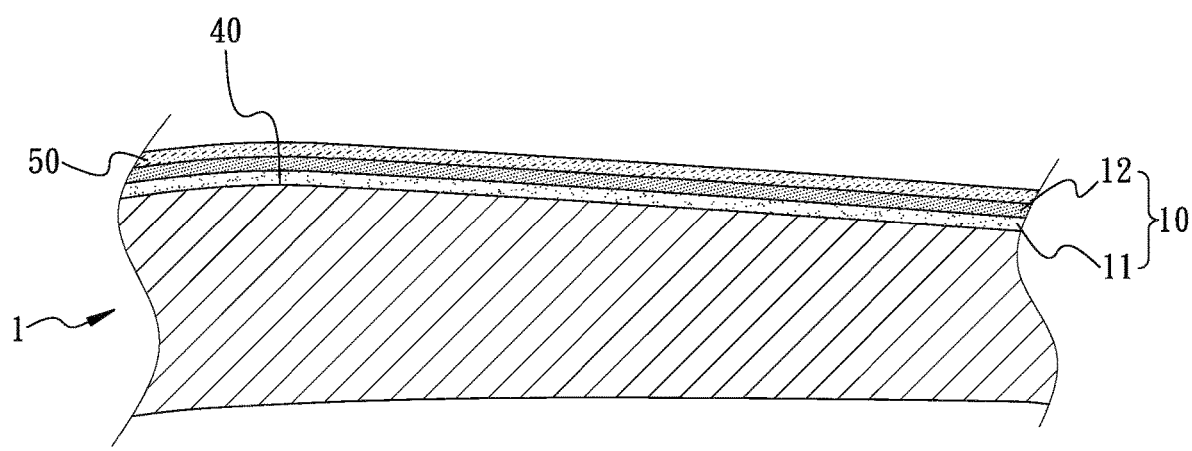
FIG. 6 is a longitudinal sectional view of the spoke of the wheel to show the selected area after the step of first painting.
Figure 7:
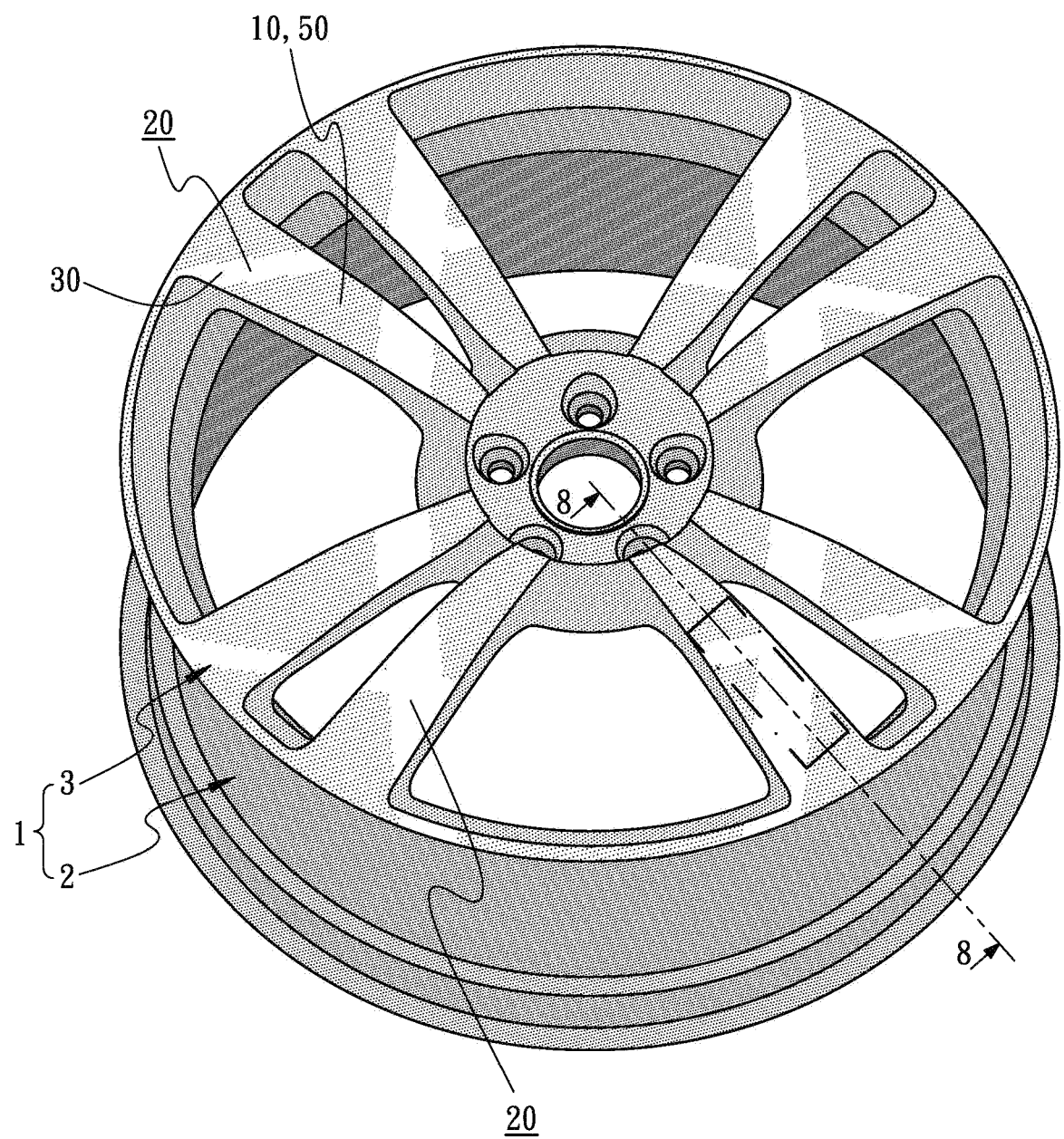
FIG. 7 shows the wheel that is treated by the step of laser carving.

As shown in FIGS. 6 and 7, in the step of laser carving S2, a selected area of the painted surface 10 is carved by laser which means colored painted surface 10 is removed from the outer wheel surface in the selected area. The selected area has an exposed area with metallic luster. The selected area in the step of laser carving S2 is located on a spokes 3 of the wheel 1 but can be located as well as on a hub and/or the rim 2 of the wheel 1. The colored painted surface 10 of the selected area is removed by way of carving to form patterns on the exposed area. The patterns can be programmed and designed so as to form desired patterns.

In the step of fine-polish S3, the outer surface of the wheel 1 is polished to form a fine-polished area 30 at the exposed area. The polished outer surface is smooth.

As shown in FIGS. 2 and 3, a step of rough polish P1 is added before the step of priming S1. In the step of rough polish P1, the wheel 1 is cleaned and has a surface polish to form a rough polished face 40 on the outer surface of the wheel 1. The first layer or undercoat 11 of the painted surface 10 in the step of priming S1 is applied to the rough polished face 40.

The exposed area in the step of laser carving S2 is uneven and rough, and in the step of fine-polish S3, the fine-polished area 30 is formed on the exposed area, and the polished outer surface is smooth. The surface roughness of the fine polished face 30 is less than that of the rough polished face 40. It is noted that the rough-polish achieves that the treated surface becomes smooth to allow the first layer or undercoat 11 to be formed thereon, and the fine-polish makes the metallic luster appear.

As shown in FIGS. 2 and 6, a step of first painting P2 is added between the step of priming S1 and the step of laser carving S2. In the step of first painting P2, a protective paint is applied to the painted surface 10 of the wheel 1 to form a first protective layer 50 on the color layer 12 which is located between the first layer or undercoat 11 and the first protective layer 50. The first protective layer 50 protects the color layer 12 from being scratched and worn by impact. In the step of laser carving S2, the painted surface 10 and the first protective layer 50 are removed by way of laser to allow the metallic luster to appear, and this step replaces the replaced milling the cutting of the conventional method.

Figure 8:
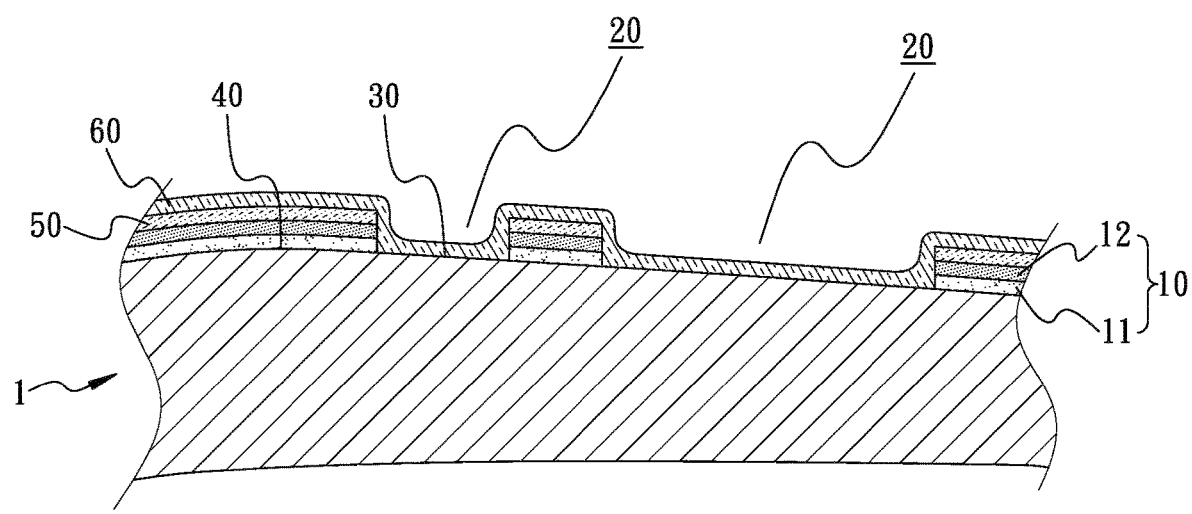
FIG. 8 is a longitudinal sectional view of the spoke of the wheel to show the selected area after the step of carving and the step of second painting.

As shown in FIGS. 2 and 8, a step of second painting P3 is added after the step of fine-polish S3. The step of second painting P3 applies a protective pain to the wheel 1 to form a second protective layer 60 on the first protective layer 50. The fine polished face 30 of the exposed area 20 includes the second protective layer 60 formed thereon. The second protective layer 60 protects the fine polished face 30 from being scratched.

The advantages of the present invention are that the method uses laser to carve the outer surface of the wheel 1, and the painted surface 10 can be quickly removed to let the metallic luster appear, or to display the patterns carved to the wheel 1. The method includes ability for anti-corrosion and reduces cost.

The outer surface of the wheel 1 treated by the method of the present invention is smooth so as to meet requirements of users.

The second protective layer 60 protects the fine polished face 30 from being scratched, and enhances the protection to the painted surface 10.

While we have shown and described the embodiment in accordance with the present invention, it should be clear to those skilled in the art that further embodiments may be made without departing from the scope of the present invention.

What is claimed is:

1. A method for laser carving of paint on an outer surface of a vehicle wheel, comprising:
   a step of priming: applying a primer on an outer surface of the vehicle wheel to form a first layer or undercoat, and a color layer is applied on the primer and combined with the primer to obtain a colored painted surface;
   a step of applying a protective paint to the painted surface of the vehicle wheel to form a first protective layer on the color layer which is located between the primer and the first protective layer;
   a step of laser carving: carving a selected area of the primer from the vehicle wheel by laser to remove the painted surface from the selected area, the selected area having an exposed area with metallic luster, and being located on one of spokes of the vehicle wheel, the selected area of the painted surface being removed by way of carving to form patterns on the exposed area;
   a step of fine-polish: polishing the outer surface of the vehicle wheel to form a fine-polished area at the exposed area; and
   applying a protective paint to the outer surface of the vehicle wheel to form a second protective layer on the first protective layer, the fine polished face of the exposed area including the second protective layer formed thereon.

2. The method as claimed in claim 1, wherein a step of rough polish is added before the step of priming and comprises:
   cleaning and proceeding surface polish to the wheel to form a rough polished face on the outer surface of the vehicle wheel, the primer layer of the painted surface in the step of priming being applied to the rough polished face.

3. The method as claimed in claim 2, wherein in the step of fine-polish, the exposed area that is formed in the selected area by way of laser carving and the rough polished face are exposed, the rough polished face of the exposed area is polished to transfer the rough polished face into the fine polished face, a surface roughness of the fine polished face is less than that of the rough polished face.

* * * * *